US008319900B2

(12) United States Patent
Candelore et al.

(10) Patent No.: US 8,319,900 B2
(45) Date of Patent: Nov. 27, 2012

(54) REMOTE CONTROL SECURITY

(75) Inventors: Brant L. Candelore, San Diego, CA (US); Robert L. Hardacker, Escondido, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 902 days.

(21) Appl. No.: 12/231,442

(22) Filed: Sep. 3, 2008

(65) Prior Publication Data

US 2010/0053462 A1 Mar. 4, 2010

(51) Int. Cl.
*H04N 5/44* (2006.01)
(52) U.S. Cl. ............................ 348/734; 725/30; 340/825
(58) Field of Classification Search .................. None
See application file for complete search history.

(56) References Cited

U.S. PATENT DOCUMENTS

| 6,181,252 | B1 | 1/2001 | Nakano |
| 6,532,592 | B1 * | 3/2003 | Shintani et al. ............... 725/141 |
| 7,039,391 | B2 | 5/2006 | Rezvani et al. |
| 7,295,252 | B2 * | 11/2007 | Watanabe et al. ............ 348/734 |
| 7,782,407 | B2 * | 8/2010 | Hicks ............................ 348/734 |
| 7,796,757 | B2 * | 9/2010 | McClenny et al. ........... 380/239 |
| 2006/0053444 | A1 * | 3/2006 | Rudolph et al. ................ 725/38 |
| 2007/0214474 | A1 | 9/2007 | McClenny et al. |
| 2007/0256126 | A1 * | 11/2007 | Erickson et al. ................ 726/20 |
| 2009/0244402 | A1 * | 10/2009 | Rye et al. ...................... 348/734 |

FOREIGN PATENT DOCUMENTS

| WO | WO 01/71685 A1 | 9/2001 |
| WO | WO 2006/127598 A2 | 11/2006 |

* cited by examiner

*Primary Examiner* — Jefferey Harold
*Assistant Examiner* — Omer Khalid
(74) *Attorney, Agent, or Firm* — Miller Patent Services; Jerry A. Miller

(57) ABSTRACT

A television receiver device consistent with certain embodiment is controlled by a remote controller has an infrared receiver that receives control signals from the remote controller. An infrared transmitter transmits signals from the television to the remote controller. A processor, upon receipt of a control signal from the remote controller sends a challenge signal to the remote controller in order to obtain a reply from the remote controller. Upon receipt of a reply to the challenge, the processor determines if the reply is correct and if so, executes the command associated with the control signal, wherein if the reply is incorrect, the command is not executed. This abstract is not to be considered limiting, since other embodiments may deviate from the features described in this abstract.

31 Claims, 6 Drawing Sheets

REMOTE CONTROL SECURITY

CROSS REFERENCE TO RELATED DOCUMENTS

This application is related to U.S. patent application Ser. No. 11/985,802 filed Nov. 16, 2007 to Robert Hardacker entitled which is hereby incorporated by reference herein.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The majority of U.S. households receive television content through cable television systems or satellite television systems. Such systems have traditionally used a few OEM suppliers of hardware (e.g., set top boxes) and have not provided for integration of non-security navigation functionality of set-top boxes directly into digital TV sets.

Under this scenario, navigation and television operational functions are generally controlled by the remote control (RC) device supplied by the service provider. This relegates the television (TV) set to the role of a simple display device, often masking capabilities of the television device so that they are either forgotten or seldom used because of need for the use of multiple remote controls to access the functionality. This frustrates innovation within the television display device itself, which may readily be provided with capabilities that are inaccessible using generic "universal" remote controls such as those provided by the service providers (e.g., MSOs or Multiple Service Operators).

In addition, an entire business has arisen for third party remote control manufacturers who incorporate the remote control codes for multiple device manufacturers into their remote controls, thereby allowing them to control products built by someone else with no licensing requirement. In this case as well as the case of cable or satellite Set-top boxes (STBs), the remote control for the STB or the universal remote control often winds up being used to control multiple devices with the factory remote control for any particular device being put aside and going unused. In the case of a television set, for example, this can result in bypassing functionality and improved interfaces available from the television set's built in user interface.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

Figure 1:
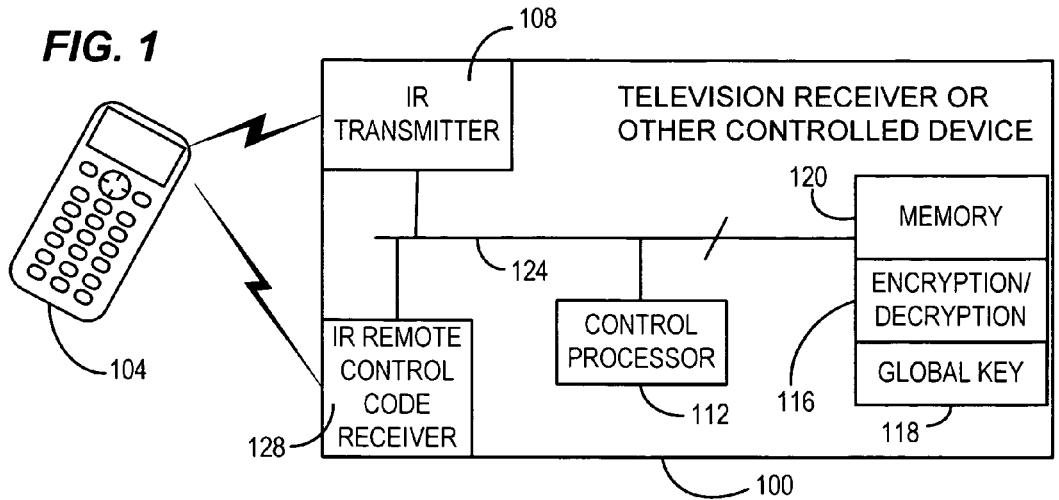
FIG. 1 is an example of an implementation of a remote controller and television system consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "program", as used herein, may also be used in a second context (the above definition being for the first context). In the second context, the term is used in the sense of a "television program". In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide. The term TV or television is intended to encompass both full television sets as well as any device having a television receiver (digital or analog).

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

In accordance with certain embodiment consistent with the present invention it a remote control device is associated with a television receiver device or other controlled device so that either the associated remote control device is the only device that can control the controlled device, or so that only limited additional functionality can be realized by any remote control device that is not the associated remote control device. Embodiments consistent with the present invention can be used for many purposes including precluding access or full access to control of certain devices without use of the properly associated remote controller.

For purposes of this document and to facilitate providing exemplary illustrations, it will be assumed of that the controlled device is a television set (TV) and the remote controller is a television set remote controller. However, other remote control operated consumer electronics devices can also serve as the controlled device (e.g., video tape players, STBs, set back boxes, audio equipment, DVD players, and other audio/video (A/V) devices). Hence, although the examples presented may reference a television device, or TV or television receiver, other such devices are also within the realm of embodiments consistent with the present invention.

In accord with certain embodiments, by establishing an IR return channel (e.g., a transmitter inside the television and a receiver inside the remote controller) in addition to the generally accepted IR forward channel from the RC and TV, shared secrets can be easily established enabling the forward channel to be encrypted either in total or in part. IR transmission is extremely low power and is well established. This invention adds a channel from the TV to the remote control. It is anticipated that the return channel would use a different frequency and modulation method from the forward channel to avoid any confusion. The IR data rate is typically quite low which also facilitates low power.

In accord with one example implementation, every four hours or so (or any other suitable time period), when a remote control sends a normal volume/channel up/down/left/right command, the TV sends a challenge to the remote control. The remote control recognizes the challenge, decrypts or encrypts the challenge with a global key (known to all remotes and TVs), and sends the result back to the TV. This challenge/result can be cryptographically secure such as using well known algorithms such as AES or RSA. The TV will then accept all remote control commands for the next period of time (e.g., four hours). If the result does not match, then the TV uses an on-screen display (OSD) to communicate with the user. In this scenario, third party aftermarket universal remote controls will work but only after the associated remote has enabled the TV to receive commands.

In another example implementation, after any period of inactivity, when a remote control is used, the TV sends a check value (for example, a single byte) to the remote control. The remote control uses this value along with a global key to create a single checksum value (in our example, a single byte) that gets appended to all commands. Since the check value can have 256 values, in this example, it is difficult for a universal remote to simply "replay" a command and checksum. This would lock up every command sent to the TV. If the checksum does not match, then the TV will not respond. A single byte of additional data on a command would not add significant latency even with relatively slow data rates. The checksum algorithm can be any suitable algorithm such as an exclusive—or operation or simple concatenation in order to be simple and quick for the TV to implement with each and every command, or can be made more complex to enhance security.

In addition to these features, the TV can respond to a "menu" command to enter into configuration screens regardless of what the challenge or checksum value is, or whether it is even present. The user can then input a security code in order to turn-off the security feature or configure the TV to accept a different type of remote controller.

Infrared technology including transmitters and receivers has become very low cost. IR can therefore be used as an effective and low cost way to send data from not only an RC to a TV, but from the TV to the RC. Thus, in certain embodiments, an infrared input is added to the remote control that right now only typically has an output. While so called "learning universal remote controls" exist which have IR inputs so that it can be placed up to an original remote control in order to learn its codes, the receivers are used in an entirely different manner. These learning remote controls analyze the captured pulses in order to identify the original remote control from an internal database. The input as discussed herein is driven by the TV to sync-up during initialization or cryptographic handshake. Some TVs or set-top boxes already have infrared output capability to drive so called "IR Blasters" (for example, to repeat remote control commands to equipment hidden behind a cabinet or in a closet). The cost for adding IR receiver capability on the remote and transmit capability on the TV or set-top box is trivial. Hence, IR technology is the preferred communication technique, but the present discussion should be interpreted to encompass other technologies as well. For example, RF is relatively simple, but it is prone to being overheard, adds cost, and tends to consume power such that RC battery life is shortened or the RC needs a charging cradle and its associated cost. Nevertheless, embodiments consistent with the present invention could be realized with RF technology too.

Turning now to FIG. 1, an exemplary embodiment of a system having a television receiver 100 and remote control 104 is depicted. In this illustration, as well as others in this document, functional elements that are not necessary to the understanding of the inventive concepts are omitted to simplify the illustration and facilitate understanding (e.g., television receiver 100 does not show a tuner, display, etc., but those skilled in the art will appreciate that they and other elements can be present and will understand how they interact with the illustrated components).

The TV receiver 100, or similar controlled device, in this embodiment utilizes an infrared (IR) transmitter 108. Transmitter 108 communicates with the RC 104, which contains an IR receiver device as will be described later to exchange a secret that is used to associate the television set 100 with the RC 104. In one embodiment, this secret is encrypted or otherwise combined with a global encryption key known to all TVs and RCs of a particular manufacture operating under control of a control processor 112 operating using stored instructions stored as a computer program 116 stored in a memory 120 such as a nonvolatile memory or disc drive. The memory 120 is also depicted as containing the encryption and decryption program 116 and a global key 118. The control processor 112 and memory 120 may communicate with each other and with the IR transmitters and receiver using a serial or parallel bus 124 or using any other conventional communication arrangement including integration into a functional integrated circuit.

Once the association between the RC 104 and the TV 100 has been established, the RC 104 can communicate (with or without encryption) with a remote control code receiver 128 using, for example, infrared (IR) communications techniques, the details of which will be described later. In other embodiments, any other suitable communication mechanism can be used including radio frequency transmission.

In one embodiment, each key pressed and received by the TV 100 will result in a change in a challenge or a change in check codes or keys for the next key pressed. In other embodiments, the challenge or check codes are only changed after a specified time period or number of events such as a number of commands. In some embodiments, the TV 100 or the remote 104 can establish the time period or number of events which can be fixed or randomized. In other embodiments, only certain codes are challenged or inspected for the proper check code.

It is noted that the term "key" as used herein has dual meaning—one meaning being the buttons or keys pressed on a remote control device, and the other being the keys used in encryption and decryption. It is believed that the meaning will be clear from the context.

Figure 2:
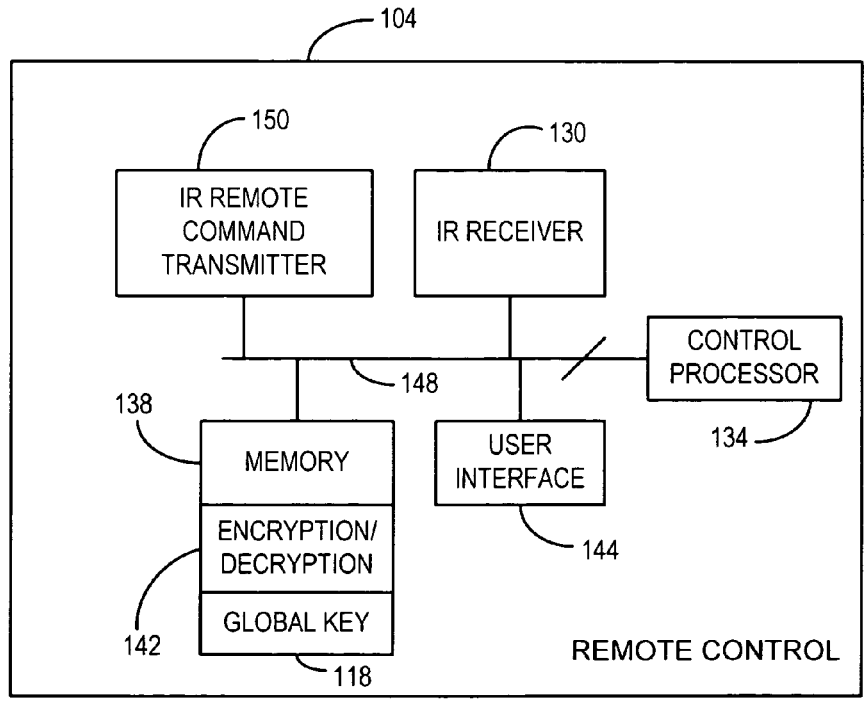
FIG. 2 is an example implementation of a remote controller device consistent with certain embodiments of the present invention.

A programmed processor based embodiment of the remote control 104 used in this embodiment is depicted in FIG. 2 in which the remote control incorporates an IR receiver 130 as well as an IR transmitter 150. Those skilled in the art will appreciate that the circuitry may be advantageously highly integrated using hardware state machines rather than general purpose processors, but the functions and attributes are readily described using the present implementation. The memory 138 may store the global key 118 as well as an encryption/decryption process instructions 142.

RC 104 operates, in certain embodiments, under control of a control processor 134 having associated memory 138. A user interface 144 (e.g., containing a number of control keys, buttons, pads, switches, etc. and possibly a display) for the RC 104 is also provided and communicates with the control processor and memory using any conventional interconnection including a bus 148 as depicted. Once a control code set is established, entry of a command via the user interface 144 is translated to a control code that is conveyed to the remote command transmitter 150 for conveyance to the TV 100.

In certain embodiments as will be described below, the processor 134 or equivalent operates as a control signal limiting device to prevent or limit an unauthorized remote controller's ability to control the controlled device such as a television set. This feature is referred to herein as security enabling the remote controller or pairing of the remote controller and the television set or controlled device.

Figure 3:
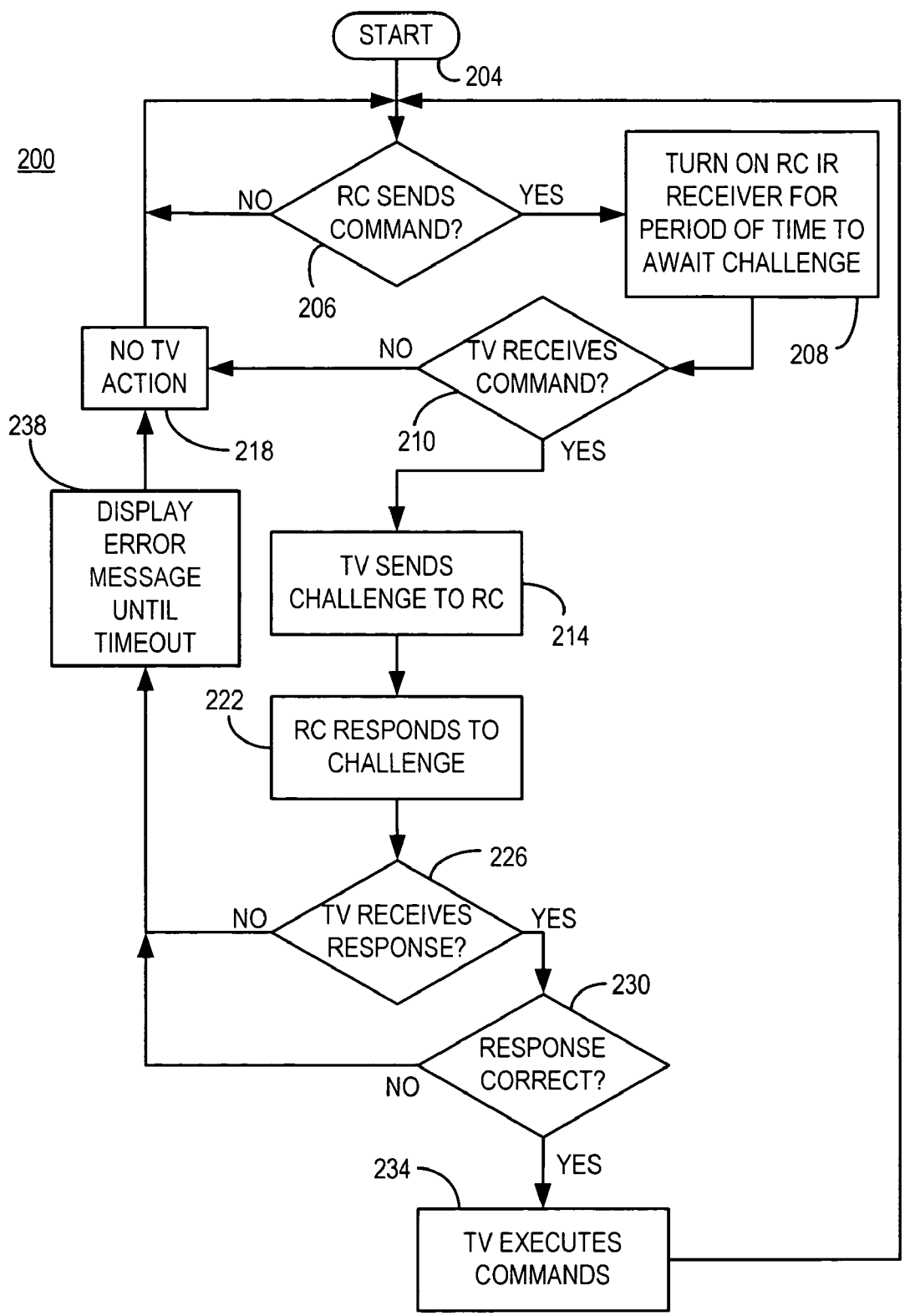
FIG. 3 is a flow chart of an exemplary method consistent with certain embodiments of the present invention.

Turning now to FIG. 3, a security enabled control process 200 embodiment consistent with the present invention is depicted in which each command from the remote controller is challenged. In this implementation, depending upon the complexity of the challenge and the communication speed, some latency may be present and apparent in every command; however, increasing processing speed and communication speed can be used to eliminate any noticeable effects of such latency. The process 200 starts at 204 and it is assumed that any counters or clocks have expired or are initialized to an expired value at this point. When the RC sends a command at 206 the RC turns on the receiver 208 for a period of time to permit receipt of a challenge as will be explained. When the TV receives the command at 210, the TV sends a challenge to the remote controller at 214. Clearly, failure to transmit a command or failure to receive a command results in no TV action that would normally be responsive to a remote controller command at 218 until such time a command is received at 210.

When the challenge is sent from the TV transmitter 108 to the remote controller receiver 130, the challenge serves the function of assuring that the remote commander is security enabled and thus properly paired with the television 100. In one embodiment, a global key 118 is shared by the TV and all remote controllers that can be security enabled to be properly paired with the TV. In one embodiment, the global key can be used to encrypt the challenge message (which can be a static or randomly changing code) to produce a response that is sent from the RC back to the TV at 222. In other embodiments, the global key can be otherwise combined with a code to create a challenge. The TV 100 carries out the same operation and upon receipt of a response at 226 the TV's computed value is compared with the received reply in order to determine if the reply is correct. If the response is correct at 230, the TV proceeds to execute the command at 234. If the TV fails to receive a response at 226 (as would occur with a remote controller that cannot receive communication from the TV) or if the RC's response is incorrect at 230, an error message can be displayed for a period of time until a timeout (e.g. 10-20 seconds or so) using an on-screen display (OSD) at 238.

The requirement to respond to the challenge effects a control signal limiting process such that without a correct response the remote controller either cannot be used to control the target device such as television 100 or only has limited ability to control the target device. In the case of the example implementation of process 200, the remote control is essentially inoperative unless a challenge for each and every command is correctly handled by the remote controller. Alternatively, only commands of a specified type (if blocks 206 and 210 are restrictive to only certain commands such as channel change, guide, volume or other command or commands) trigger a challenge from the TV 100. In this case, other remote controllers can be used to carry out certain functions, but the properly paired remote controller is required for certain commands. In other embodiments, as will be described, the security enablement can be permanently or temporarily disabled.

It will be understood in the illustrative processes that follow that block 208 is omitted, but is to be included whenever it is contemplated that a challenge, check code or other transmission from the television is to be received. With that understanding, block 208 is omitted for ease of illustration in the flow charts that follow.

Figure 4:
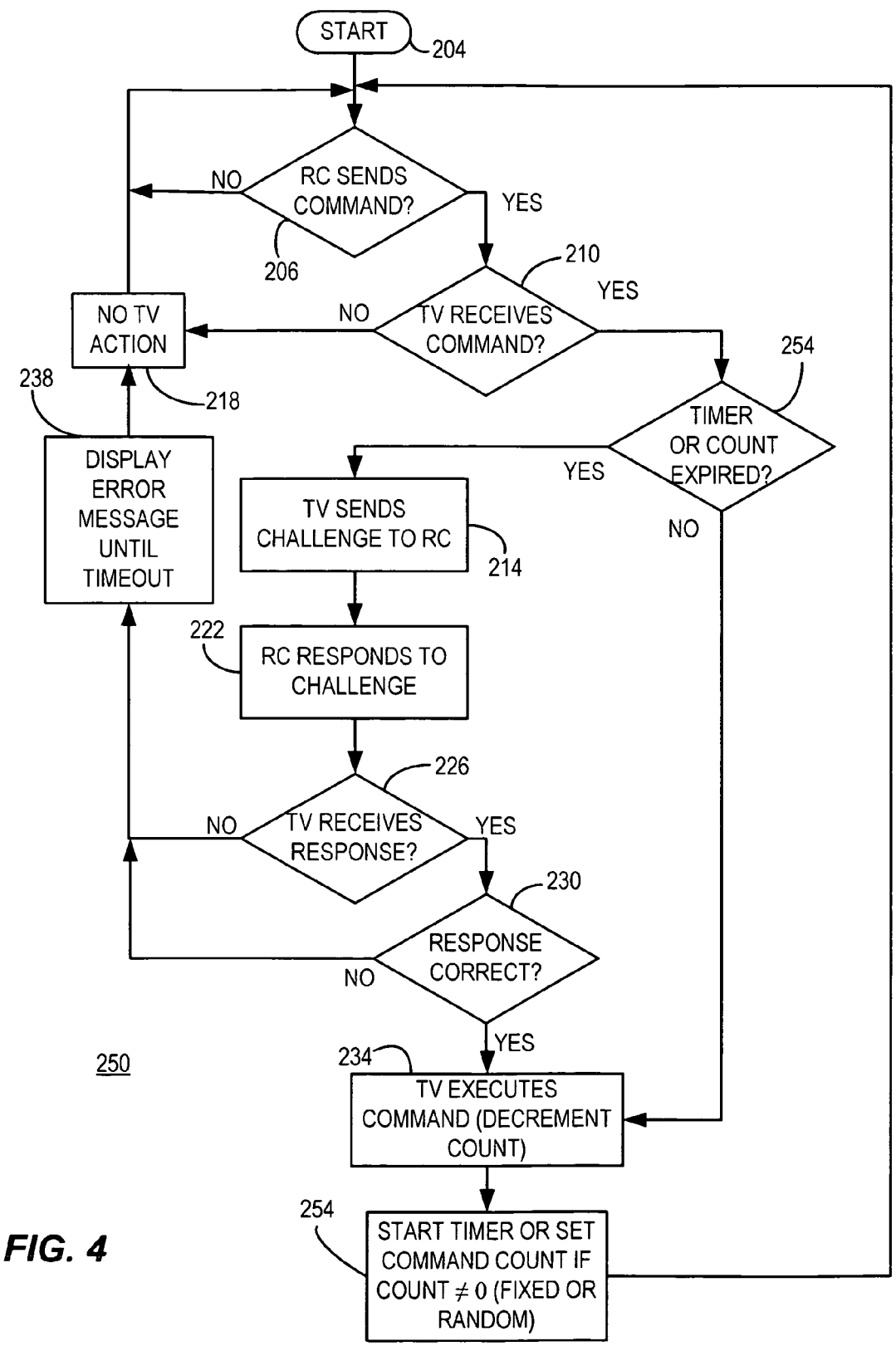
FIG. 4 is a flow chart of an exemplary method consistent with certain embodiments of the present invention.

FIG. 4 depicts a flow chart of an illustrative process 250 which is a variation of process 200. In this variation, the process behaves much the same as previously described in connection with process 200, except that when a correct response is received at 230, not only does the TV execute the command at 234, but in addition, a timer or counter is started at 254. The timer can be, for example for four hours in one embodiment, but longer or shorter times or user programmable or random times can also be used without limitation. Once the timer has been set, when a command is received by TV 100 at 210, a check is made to determine if the timer has expired at 254. If not, instead of requiring a challenge unchallenged commands are accepted and executed at 234 until such time as the timer has expired. This serves the function of reducing latency in receipt and execution of commands as well as clearing the TV 100 to receive commands from alternative remote commanders during the time period. In other embodiments, rather than establishing a time period, a number of commands can be established (e.g., 5 or 15 or 30, etc.) commands may be accepted without need to issue a challenge. In this case, at 254 a command counter is set and decremented each time a command is received or executed (as shown in 234) until the counter reaches zero. The command count is not reset unless equal to zero as indicated at 254.

In the example as illustrated in the case of a timer, whenever a command is received during the time period of the timer, the timer is reset. Thus, the timer essentially serves as an inactivity timer whose value is reset any time a new command is issued during the time period of the timer. Hence, a new challenge can be indefinitely delayed if new commands are issued frequently enough. Alternatively, the process can be modified (or interpreted as) only resetting the timer if the timer has not expired. In this case, the time interval during which a new challenge will not be issued is absolute with respect to the timer.

Figure 5:
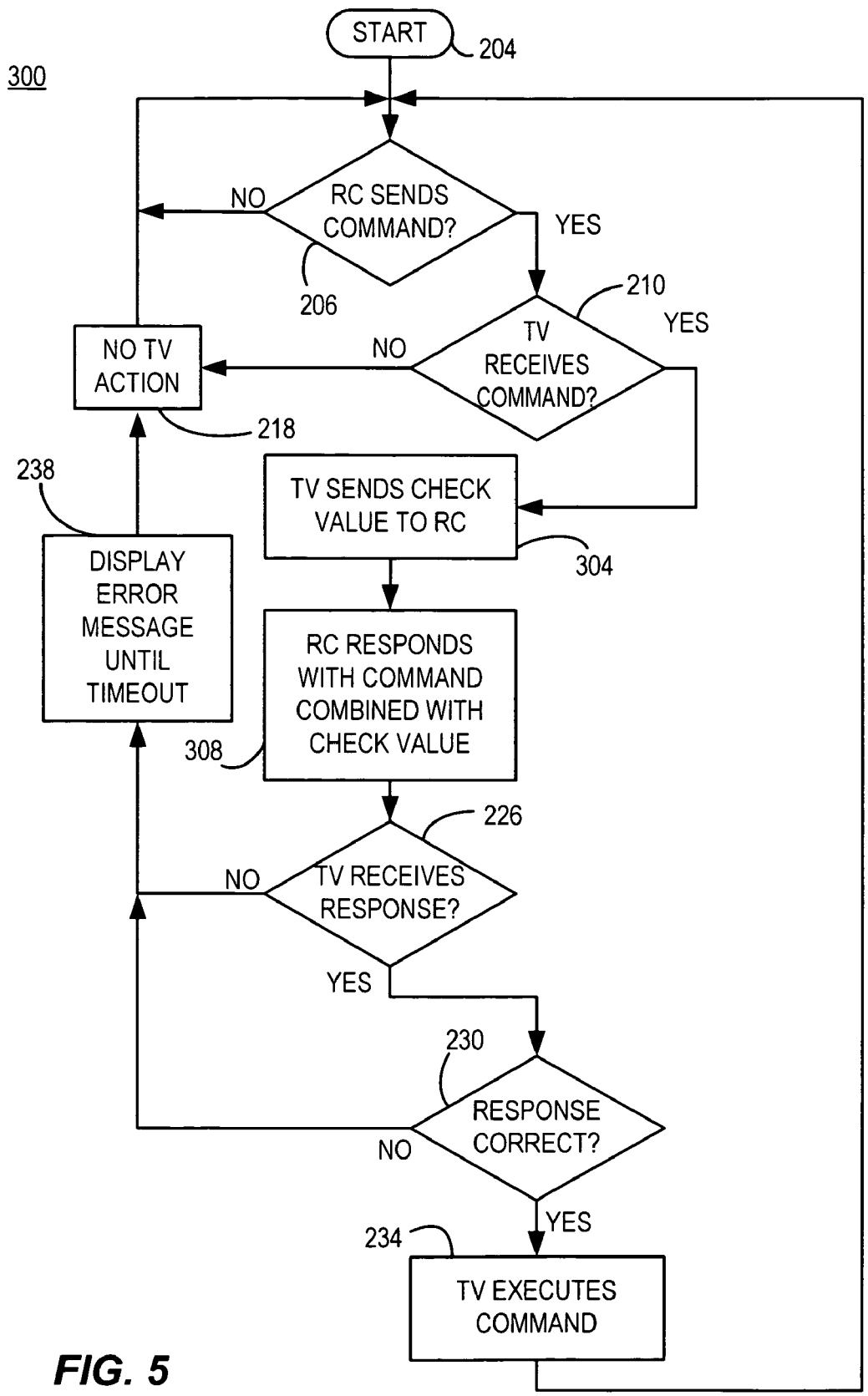
FIG. 5 is a flow chart of an exemplary method consistent with certain embodiments of the present invention.

Another example implementation is depicted in FIG. 5 as process 300. This process resembles process 200 except that the challenge takes a different form. In this example, when the TV receives a command at 210, the TV 100 sends a check value to the RC 104 at 304. This check value can take any number of forms such as a randomly generated 8 bit byte. With a randomly generated binary 8 bit byte, there are 256 possibilities for the check value. This byte can then be combined with the command or with the global key using a fast algorithm and the RC responds with this combined value at 308. The process is then similar to that disclosed in process 200. However, in this case, consider several examples. In a first example, the command is Exclusive ORed with the command in some manner. Thus, if the command structure is in the form of an 8 bit byte, the command and the check value can be rapidly Exclusive OR combined to produce an output. This requires minimal computing power to achieve, thus saving power and permitting the RC to respond quickly.

Another simple algorithm is to combine the check value with the command by simply concatenating the two values together. In another example, the check value can be algorithmically related to the global key or a combination of the global key and the check value (e.g., a concatenation or Exclusive OR combination thereof). Other examples will occur to those skilled in the art without departing from embodiments consistent with the present invention. By use of a simple algorithm that combines the command with a check value or other simple algorithm, the latency is improved and power consumption is minimized.

Figure 6:
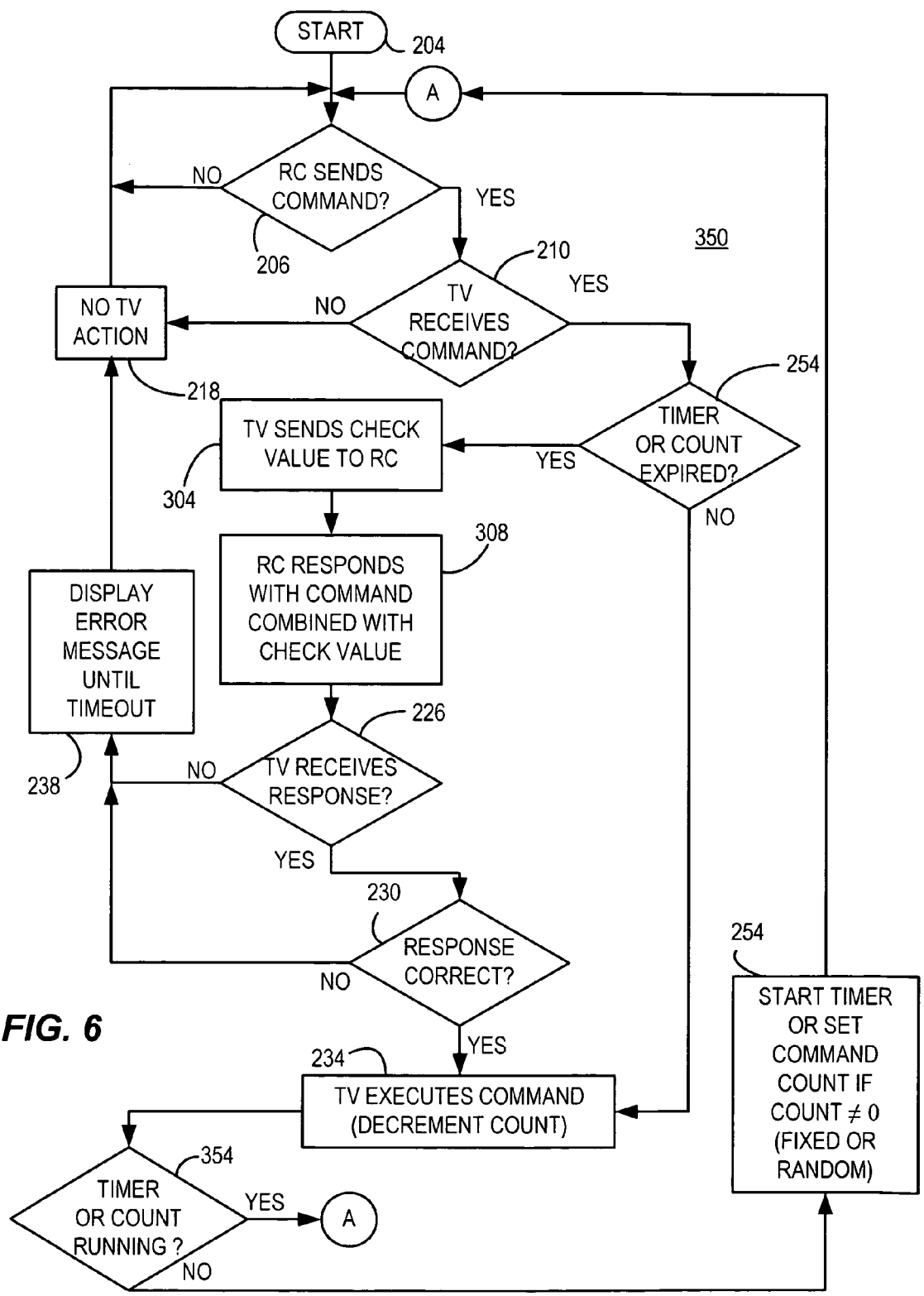
FIG. 6 is a flow chart of an exemplary method consistent with certain embodiments of the present invention.

However, if latency is an issue or if it is desired to operate the system in a manner that permits use of a non-security enabled remote control, the process 350 as depicted in FIG. 6 can be used. In this case, as with process 250, when a correct response is received at 230, not only does the TV execute the command at 234, but in addition, a timer or counter is started at 254. The timer can be, for example for four hours in one embodiment, but longer or shorter times (e.g., one hour or 24 hours) or user programmable or random times can also be used without limitation. Once the timer has been set, when a command is received by TV 100 at 210, a check is made to determine if the timer has expired at 254. If not, instead of requiring a new check value, all commands are accepted and executed at 234 until such time as the timer has expired. This serves to reduce latency in receipt and execution of commands as well as clearing the TV 100 to receive commands from alternative remote commanders during the time period as in process 250. Also as in 250, in other embodiments, rather than establishing a time period, a number of commands can be established (e.g., 5 or 15 or 30, etc.) commands may be accepted without need to issue a new check value. In this case, at 254 a command counter is set and decremented each time a command is received or executed (as shown in 234) until the counter reaches zero. The command count is not reset unless equal to zero as indicated at 254.

In the example illustrated, the timer is only reset if the timer has not expired (as contrasted to process 250). In this case, the time interval during which a new challenge will not be issued is absolute with respect to the timer. That is, if the timer is running or the counter has not reached the final count, at 354, the process returns to 206 to await the next command. Only if the timer has expired or the count has reached the end count (e.g., counting down to zero) will the counter or timer reset at 254. Once the count has ended or the timer has expired, the command is again checked at the process flow through 304, 308, 226 and 230 to permit the counter or timer to reset.

Alternatively in the case of a timer, whenever a command is received during the time period of the timer, the timer is reset. Thus, the timer essentially serves as an inactivity timer whose value is reset any time a new command is issued during the time period of the timer. Hence, a new challenge can be indefinitely delayed if new commands are issued frequently enough.

Figure 7:
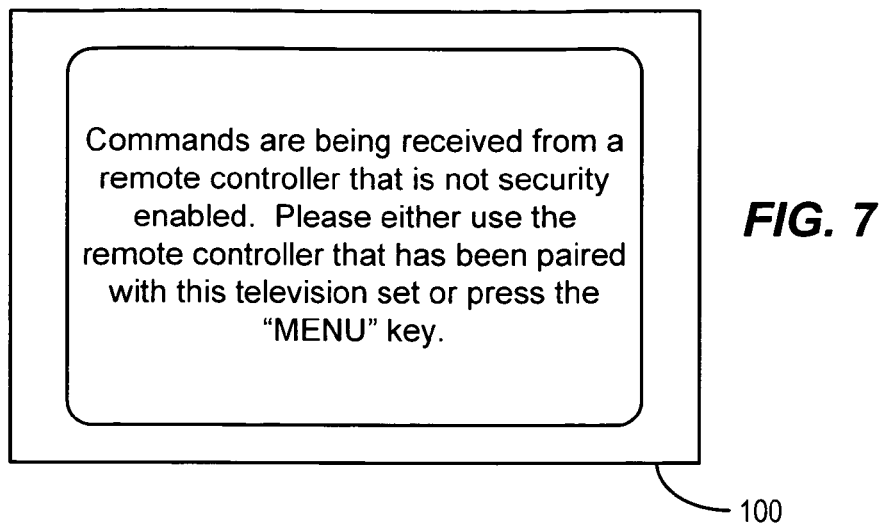
FIG. 7 is an illustration of a television display showing an error message resulting from the use of a remote controller that is not security enabled in accord with the with certain exemplary implementations consistent with the present invention.
Figure 8:
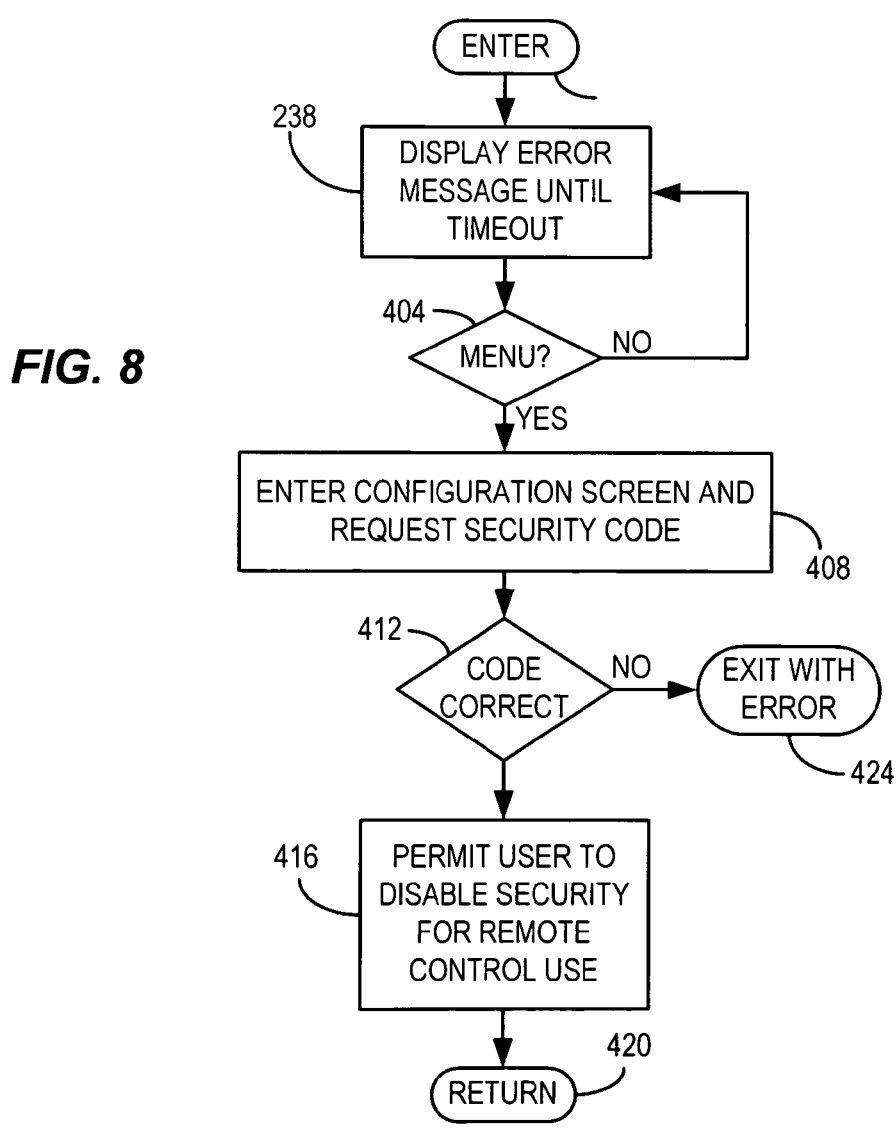
FIG. 8 is a flow chart of an exemplary method consistent with certain embodiments of the present invention.

In each of the prior described processes, at 238 an error message can be displayed to the user (for example on the television display) such as that shown in FIG. 7. In this example, any user can access a setup menu by pressing the remote controller's designated "MENU" key (or other particular key or keys). In so doing, the process can be adapted to permit an authorized user to use a non-paired remote controller that is not security enabled to control the television with the non-paired remote controller. This process is further illustrated as process 400 in FIG. 8. Any of the prior processes can be adapted to permit this process branch which is entered prior to 238 where the message of FIG. 7 or similar is displayed. If prior to the message timing out and the television returning to its prior state the user presses the menu button at 404 a configuration screen appears and the user is presented with a query for a security code. If the user can correctly enter the security code at 412, the user is permitted to enter the configuration and setup menu screens and can even disable the security pairing feature at 416 permanently or for a designated period of time. The process then resumes as previously described. If the code is incorrectly entered at 424, the process exits with an error and resumes from the prior state of operation.

As will be appreciated by those skilled in the art, by pairing the television set with a specific remote control, not only is the user provided with full capabilities of the manufacturer's remote control, but also is afforded a degree of security. Since proper operation of the television depends upon use of a properly paired remote controller, the theft of the television without the remote control results in a product that is more difficult or impossible to use and thus the sale of stolen merchandise is discouraged. In addition, by use of IR technology in cooperation with the encryption capabilities built into the TV and RC a quite secure link between the TV and the remote control is obtained facilitating E-commerce applications since key presses used for entering PINs or passwords or credit card or other account numbers, may be obscured.

Hence, as described above, when a remote control sends a normal command such as a volume/channel up/down/left/right command, the TV sends a challenge to the remote control. The remote control recognizes the challenge, decrypts the challenge with a global key (known to all remotes and TVs), and sends the result back to the TV. This challenge/result can be cryptographically secure such using well known algorithms just as AES or RSA. Depending on the implementation, the TV can then accepts all remote control commands (e.g., for a period of time). If the result does not match, then the TV uses an OSD to communicate with the user. In this scenario, 3rd party universal remote controls will work but only after the appropriately paired remote has enabled the TV to receive commands.

In certain implementations, after any period of inactivity, when a remote control is used, the TV can send a check value (for example, a single byte) to the remote. The remote uses this value along with a global key to create a single checksum value (for example, a single byte) that gets appended to all commands. Since the CHECK value can have 256 values. It is difficult for a universal remote to simply "replay" a command and checksum. This would lock up every command sent to the TV. If the checksum does not match, then the TV will not respond. A single byte would not add much to latency. The checksum algorithm would be simple and quick for the TV to implement on each and every command.

To keep the power consumption low on the RC, it is preferred that the RC only listen in specific contextual based situations such as if it sends a command that is likely to evoke a "challenge" or command that warrants a response from the TV.

Thus, in certain implementations, a television receiver device that is controlled by a remote controller has an infrared receiver that receives control signals from the remote controller. An infrared transmitter transmits signals from the television to the remote controller. A processor, upon receipt of a control signal from the remote controller sends a challenge signal to the remote controller in order to obtain a reply from the remote controller. Upon receipt of a reply to the challenge, the processor determines if the reply is correct and if so, executes the command associated with the control signal, wherein if the reply is incorrect, the command is not executed.

In certain implementations, once a correct reply to the challenge is received by the television, future commands are accepted based upon a control limiting procedure. In certain implementations, the control limiting procedure accepts control signals for execution of their associated command for a period of time following the receipt of the correct reply. In certain implementations, the control limiting procedure accepts control signals for execution of their associated command for a specified number of commands following the receipt of the correct reply. In certain implementations, the challenge comprises sending a code to the remote controller; and wherein the reply is correct if the code is correctly processed with a global key known to both the television receiver device and the remote control using an algorithm. In certain implementations, the challenge comprises sending a check value to the remote controller; and wherein the reply is correct if the check value is returned from the remote controller combined with the control code. In certain implementations, if the reply is not correct, the television displays an error message. In certain implementations, the error message provides a prompt to enter a setup menu, and whereby the setup menu provides for entry of a security code in order to disable challenges from the television receiver device. In certain implementations, challenges are sent only after a time period of inactivity of the remote controller. In certain implementations, challenges are sent only during a time period wherein a timer is not running or a command counter is not counting commands.

In another implementation, a television receiver device that is controlled by a remote controller has an infrared receiver that receives control signals from the remote controller. An infrared transmitter that transmits signals from the television to the remote controller. A processor, upon receipt of a control signal from the remote controller sends a challenge signal to the remote controller in order to obtain a reply from the remote controller. Upon receipt of a reply to the challenge, the processor determines if the reply is correct and if so, executes the command associated with the control signal. If the reply is incorrect, the command is not executed. The control limiting procedure accepts control signals for execution of their associated command for a period of time following the receipt of the correct reply. If the reply is not correct, the television displays an error message and wherein the error message provides a prompt to enter a setup menu; and whereby the setup menu provides for entry of a security code in order to disable challenges from the television receiver device.

In certain implementations, the challenge comprises sending a code to the remote controller; and wherein the reply is correct if the code is correctly processed with a global key known to both the television receiver device and the remote control using an algorithm. In certain implementations, the challenge comprises sending a check value to the remote controller; and wherein the reply is correct if the check value is returned from the remote controller combined with the control code.

In another implementation, a television remote controller device that controls a television receiver device has an infrared transmitter that transmits remote control command signals from the remote controller to the television receiver device. An infrared receiver receives a challenge signal from the television receiver device in response to a remote control command signal from the remote controller. A processor, upon receipt of the challenge signal computes a reply to the challenge signal and transmits the reply to the television receiver device via the infrared transmitter. Upon receipt of a reply to the challenge, the television receiver device determines if the reply is correct and if so, executes the command associated with the control signal, and if the reply is incorrect, the command is not executed.

In certain implementations, once a correct reply to the challenge is received by the television, future commands are accepted based upon a control limiting procedure. In certain implementations, the control limiting procedure accepts control signals for execution of their associated command for a period of time following the receipt of the correct reply. In certain implementations, the control limiting procedure accepts control signals for execution of their associated command for a specified number of commands following the receipt of the correct reply. In certain implementations, the challenge comprises sending a code to the remote controller; and wherein the reply is correct if the code is correctly processed with a global key known to both the television receiver device and the remote control using an algorithm. In certain implementations, the challenge comprises sending a check value to the remote controller; and wherein the reply is correct if the check value is returned from the remote controller combined with the control code. In certain implementations, if the reply is not correct, the television displays an error message. In certain implementations, the error message provides a prompt to enter a setup menu; and the setup menu provides for entry of a security code in order to disable challenges from the television receiver device. In certain implementations, challenges are sent only after a time period of inactivity of the remote controller. In certain implementations, challenges are sent only during a time period wherein a timer is not running or a command counter is not counting commands.

Another implementation of a television remote controller device that controls a television receiver device also has an infrared transmitter that transmits remote control command signals from the remote controller to the television receiver device. An infrared receiver receives a challenge signal from the television receiver device in response to a remote control command signal from the remote controller. A processor, upon receipt of the challenge signal computes a reply to the challenge signal and transmits the reply to the television receiver device via the infrared transmitter. Upon receipt of a reply to the challenge, the television receiver device determines if the reply is correct and if so, executes the command associated with the control signal, and if the reply is incorrect, the command is not executed. If the reply is not correct, the television displays an error message, and the error message provides a prompt to enter a setup menu; and whereby the setup menu provides for entry of a security code in order to disable challenges from the television receiver device.

In certain implementations, once a correct reply to the challenge is received by the television, future commands are accepted based upon a control limiting procedure. In certain implementations, the control limiting procedure accepts control signals for execution of their associated command for a period of time following the receipt of the correct reply. In certain implementations, challenges are sent only after a time period of inactivity of the remote controller.

Those skilled in the art will recognize, upon consideration of the above teachings, that certain of the above exemplary embodiments are based upon use of one or more programmed processors. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

Certain embodiments described herein, are or may be implemented using a programmed processor executing programming instructions that are broadly described above in flow chart form that can be stored on any suitable electronic or computer readable storage medium. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A television receiver device that is controlled by a remote controller, comprising:
   an infrared receiver that receives control signals from the remote controller;
   an infrared transmitter that transmits signals from the television to the remote controller;
   a processor that, upon receipt of a control signal from the remote controller sends an encrypted challenge to the remote controller in order to obtain a reply from the remote controller, where the encrypted challenge is encrypted using a global key known to both the remote controller and the television;
   where the challenge and reply are sent automatically without user action;
   where the challenge and reply to the challenge comprise encrypted messages that serve to assure that the remote controller is properly paired with the television receiver, and where a remote controller that is improperly paired with the television receiver will not execute the command;
   wherein, upon receipt of an encrypted reply to the challenge, the processor decrypts the reply using the global key and determines if the reply is correct and if so, executes the command associated with the control signal; and
   wherein if the reply is incorrect, the command is not executed.

2. The television receiver device according to claim 1, wherein once a correct reply to the challenge is received by the television, future commands are accepted based upon a control limiting procedure.

3. The television receiver device according to claim 2, wherein the control limiting procedure accepts control signals for execution of their associated command for a period of time following the receipt of the correct reply.

4. The television receiver device according to claim 2, wherein the control limiting procedure accepts control signals for execution of their associated command for a specified number of commands following the receipt of the correct reply.

5. The television receiver device according to claim 1, wherein the challenge comprises sending a code to the remote controller; and wherein the reply is correct if the code is correctly processed with the global key known to both the television receiver device and the remote control using an algorithm.

6. The television receiver device according to claim 1, wherein the challenge comprises sending a check value to the remote controller; and wherein the reply is correct if the check value is returned from the remote controller combined with the control code.

7. The television receiver device according to claim 1, wherein if the reply is not correct, the television displays an error message.

8. The television receiver device according to claim 7, wherein the error message provides a prompt to enter a setup menu; and whereby the setup menu provides for entry of a security code in order to disable challenges from the television receiver device.

9. The television receiver device according to claim 1, wherein challenges are sent only after a time period of inactivity of the remote controller.

10. The television receiver device according to claim 1, wherein challenges are sent only during a time period wherein a timer is not running or a command counter is not counting commands.

11. A television receiver device that is controlled by a remote controller, comprising:
    an infrared receiver that receives control signals from the remote controller;
    an infrared transmitter that transmits signals from the television to the remote controller;
    a processor that, upon receipt of a control signal from the remote controller sends an encrypted challenge to the remote controller in order to obtain a reply from the remote controller, where the encrypted challenge is encrypted using a global key known to both the remote controller and the television;

where the challenge and reply to the challenge comprise encrypted messages that serve to assure that the remote controller is properly paired with the television receiver, and where a remote controller that is improperly paired with the television receiver will not execute the command;

wherein, upon receipt of an encrypted reply to the challenge, the processor decrypts the reply using the global key and determines if the reply is correct and if so, executes the command associated with the control signal;

where the challenge and reply are sent automatically without user action;

wherein if the reply is incorrect, the command is not executed;

wherein a control limiting procedure accepts control signals for execution of their associated command for a period of time following the receipt of the correct reply; and wherein if the reply is not correct, the television displays an error message and wherein the error message provides a prompt to enter a setup menu; and whereby the setup menu provides for entry of a security code in order to disable challenges from the television receiver device.

12. The television receiver device according to claim 11, wherein the challenge comprises sending a code to the remote controller; and wherein the reply is correct if the code is correctly processed with global key known to both the television receiver device and the remote control using an algorithm.

13. The television receiver device according to claim 11, wherein the challenge comprises sending a check value to the remote controller; and wherein the reply is correct if the check value is returned from the remote controller combined with the control code.

14. A television remote controller device that controls a television receiver device, comprising:

an infrared transmitter that transmits remote control command signals from the remote controller to the television receiver device;

an infrared receiver that receives an encrypted challenge from the television receiver device in response to a remote control command signal from the remote controller;

a processor that, upon receipt of the challenge computes an encrypted reply to the encrypted challenge and transmits the encrypted reply to the television receiver device via the infrared transmitter, where the encrypted challenge and the encrypted reply are encrypted using a global key known to both the remote controller and the television;

where the challenge and reply are sent automatically without user action;

where the challenge and reply to the challenge comprise encrypted messages that serve to assure that the remote controller is properly paired with the television receiver, and where a remote controller that is improperly paired with the television receiver will not execute the command; and wherein, upon receipt of a reply to the challenge, the television receiver device determines if the reply is correct and if so, executes the command associated with the control signal, and if the reply is incorrect, the command is not executed.

15. The television remote controller device according to claim 14, wherein once a correct reply to the challenge is received by the television, future commands are accepted based upon a control limiting procedure.

16. The television remote controller device according to claim 15, wherein the control limiting procedure accepts control signals for execution of their associated command for a period of time following the receipt of the correct reply.

17. The television remote controller device according to claim 15, wherein the control limiting procedure accepts control signals for execution of their associated command for a specified number of commands following the receipt of the correct reply.

18. The television remote controller device according to claim 14, wherein the challenge comprises sending a code to the remote controller; and wherein the reply is correct if the code is correctly processed with the global key known to both the television receiver device and the remote control using an algorithm.

19. The television remote controller device according to claim 14, wherein the challenge comprises sending a check value to the remote controller; and wherein the reply is correct if the check value is returned from the remote controller combined with the control code.

20. The television remote controller device according to claim 14 wherein if the reply is not correct, the television displays an error message.

21. The television remote controller device according to claim 20, wherein the error message provides a prompt to enter a setup menu; and whereby the setup menu provides for entry of a security code in order to disable challenges from the television receiver device.

22. The television remote controller device according to claim 14, wherein challenges are sent only after a time period of inactivity of the remote controller.

23. The television remote controller device according to claim 14, wherein challenges are sent only during a time period wherein a timer is not running or a command counter is not counting commands.

24. A television remote controller device that controls a television receiver device, comprising:

an infrared transmitter that transmits remote control command signals from the remote controller to the television receiver device;

an infrared receiver that receives an encrypted challenge from the television receiver device in response to a remote control command signal from the remote controller;

a processor that, upon receipt of the encrypted challenge signal computes an encrypted reply to the encrypted challenge signal and transmits the encrypted reply to the television receiver device via the infrared transmitter, where the encrypted challenge and the encrypted reply are encrypted using a global key known to both the remote controller and the television;

where the challenge and reply to the challenge comprise encrypted messages that serve to assure that the remote controller is properly paired with the television receiver, and where a remote controller that is improperly paired with the television receiver will not execute the command;

where the challenge and reply are sent automatically without user action;

wherein, upon receipt of the encrypted reply to the encrypted challenge, the television receiver device determines if the reply is correct and if so, executes the command associated with the control signal, and if the reply is incorrect, the command is not executed; and wherein if the reply is not correct, the television displays an error message, and the error message provides a prompt to enter a setup menu; and whereby the setup menu provides for entry of a security code in order to disable challenges from the television receiver device.

25. The television remote controller device according to claim 24, wherein once a correct reply to the challenge is received by the television, future commands are accepted based upon a control limiting procedure.

26. The television remote controller device according to claim 25, wherein the control limiting procedure accepts control signals for execution of their associated command for a period of time following the receipt of the correct reply.

27. The television remote controller device according to claim 24, wherein challenges are sent only after a time period of inactivity of the remote controller.

28. The television receiver device according to claim 1, further comprising a timer, where the timer sets a time period after receipt of a correct reply during which time period additional control signals from the remote controller are executed without any additional challenge and reply.

29. The television receiver device according to claim 11, where the control limiting procedure controls a timer, where the timer sets a time period after receipt of a correct reply during which time period additional control signals from the remote controller are executed without any additional challenge and reply.

30. The television remote controller device according to claim 14, where the television receiver device includes a timer, where the timer sets a time period after receipt of a correct reply during which time period additional control signals from the remote controller are executed without any additional challenge and reply.

31. The television remote controller device according to claim 24, where the television receiver device includes a timer, where the timer sets a time period after receipt of a correct reply during which time period additional control signals from the remote controller are executed without any additional challenge and reply.

* * * * *